United States Patent [19]

Greenberg et al.

[11] 4,084,861
[45] Apr. 18, 1978

[54] THRUST BEARING DAMPING MEANS

[75] Inventors: Paul B. Greenberg, Manchester, Conn.; Stephen D. Patterson, North Palm Beach, Fla.

[73] Assignee: United Technologies Corporation, Hartford, Conn.

[21] Appl. No.: 740,891

[22] Filed: Nov. 11, 1976

[51] Int. Cl.² ............................................. F16C 27/00
[52] U.S. Cl. ........................................ 308/26; 308/35; 308/184 R; 308/189 R; 308/187.1
[58] Field of Search .............. 308/219, 227, 135, 139, 308/166, 9, 163, 233, 188, 189, 15, 184 R, 26, 187.1, 174, 184 A, 28, 35, 78, DIG. 15, 79 A, 132, 36.1, 171, 172, 175–176, 187, 240; 188/1 B

[56] References Cited

U.S. PATENT DOCUMENTS

| | | | |
|---|---|---|---|
| 2,499,837 | 3/1950 | Sheets et al. | 308/174 X |
| 2,972,504 | 2/1961 | Baker | 308/184 R |
| 3,473,853 | 10/1969 | Goss et al. | 308/15 |
| 3,756,672 | 9/1973 | Hibner et al. | 308/189 A X |

*Primary Examiner*—Trygve M. Blix
*Assistant Examiner*—Douglas C. Butler
*Attorney, Agent, or Firm*—Norman Friedland

[57] ABSTRACT

A radial deflecting support member interposed between the damper support and the thrust bearing transmits the thrust loads and permits the use of an oil damper in a thrust loaded environment. The radial deflecting support has a spring rate that is at least equal to or lower than the damper support, so that when the radial deflecting support bottoms out the radial load will be absorbed by the damper support.

6 Claims, 2 Drawing Figures

THRUST LOAD

RADIAL DEFLECTION

THRUST BEARING DAMPING MEANS

BACKGROUND OF THE INVENTION

This invention relates to means for damping with oil bearings and more particularly to oil damping of thrust bearings.

This invention constitutes an improvement over the structure described in U.S. Pat. No. 3,756,672 granted to D. H. Hibner and Roger J. Comeau on Sept. 4, 1973 and assigned to the same assignee. The bearing and its oil damping means described in U.S. Pat. No. 3,756,672, supra, discloses an oil well disposed in an annular groove surrounding the outer race and sufficiently dimensioned to perform the damping functions. Namely, the slight radial movement on the outer race, excites the captured oil and dampens the vibratory motions associated with high speed rotation. Inasmuch as the load carried by this bearing is radial the oil damper is ideally suited since the radial motion is inherent in the design. It should be noted that oil damping can be applied to either race.

However, this oil damper does not lend itself to being used when it is desirous to dampen a thrust loaded bearing because the radial motion of either race would be opposed by the friction force between the thrust face of the race and the adjacent face of the bearing support. We found that we can obviate the problems associated with oil damping a thrust bearing by incorporating in addition to the conventional thrust bearing support, a support member that exhibits a low radial spring rate. This low radial spring rate will permit radial motion and allow the oil damper to function as it does in a conventional radial bearing oil damper by eliminating the friction force of the race and the adjacent face of the bearing support. The damper support design permits the stiffer damper support to take the full radial deflection of the rotor under severe operating conditions which may be occasioned by a loss of blade, severe flight loading conditions, large imbalance, etc.

SUMMARY OF THE INVENTION

An object of this invention is to provide improved damping means for a thrust bearing.

A still further object of this invention is to permit the use of an oil damper for a thrust bearing by providing a member exhibiting the appropriate radial spring rate and being capable of transmitting the thrust from the bearing to the casing interposed between the bearing race and the damper support.

A still further object of this invention is to provide for a thrust bearing damper means supported by a member which is mounted in series with a radial deflecting member that transmits the thrust load to the casing such that upon high radial excursions of the radial deflecting member it will bottom out against that damper support member so as to absorb the radial loads.

Other features and advantages will be apparent from the specification and claims and from the accompanying drawing which illustrates an embodiment of the invention.

DESCRIPTION OF THE PREFERRED EMBODIMENT

For the sake of simplicity and convenience, the details of the turbine type power plant is omitted herefrom and only that portion to which this invention pertains is described. It will be appreciated that this invention pertains to all types of turbine types of power plants inasmuch as they all require means to support thrust loads and is particularly efficacious where the shaft speeds are such that they manifest severe vibrations. As will be apparent to one skilled in the art that the invention is not limited to the engine but has application in any environment where damping is required in a thrust bearing. It should be appreciated that although oil is preferred in the damper any other fluid is contemplated within the scope of this invention.

Figure 1:
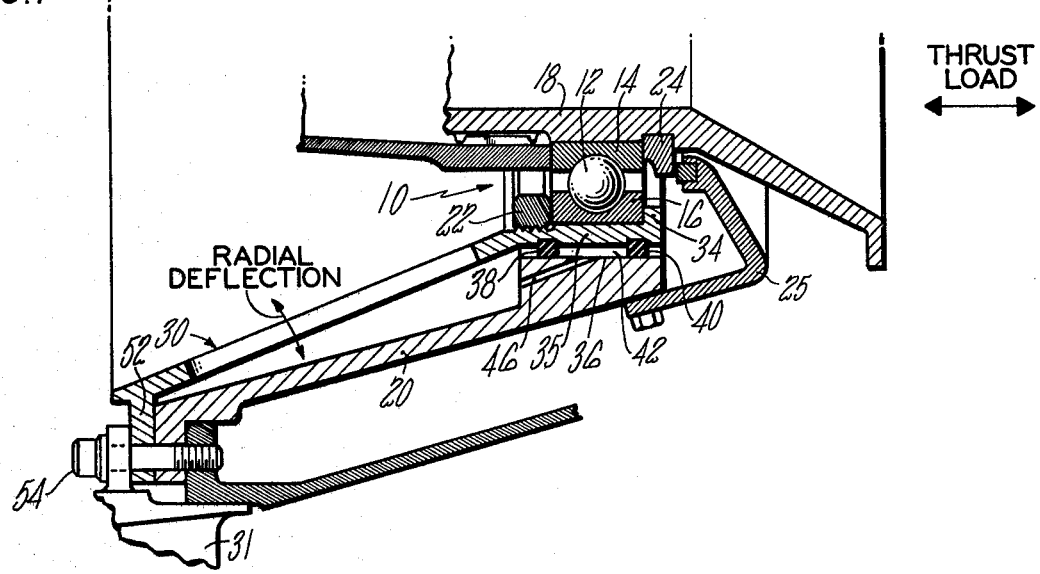
FIG. 1 is a partial view in section showing a ball bearing designed to support the thrust loads of a turbine type power plant and the attendant oil damper.

Looking at FIG. 1 the thrust bearing generally indicated by reference numeral 10 comprises a plurality of spherical balls 12 (one being shown) suitably supported by an inner race 14 and outer race 16. The ball bearing supports rotor shaft 18 that is rotatably mounted about the damper support member 20 and is locked in position by lock nut 22 and flange 34 on the outer diameter.

Obviously, the bearing would be suitably lubricated and the excess lubricant would be captured in the compartment defined by housing 25 which bears up against seal plate 24.

Figure 2:
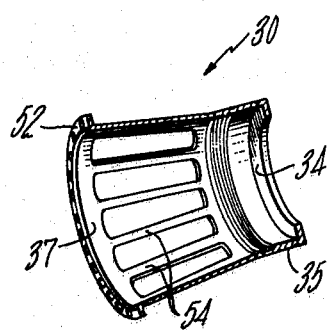
FIG. 2 is a perspective view of the radial deflecting member.

In accordance with this invention conically shaped member 30 is interposed between the outer race 16 and the damper support member 20. As seen in FIGS. 1 and 2, member 30 is fabricated like a squirrel cage having a plurality of spokes or web-like elements 54 between annular ends 35 and 37 which permits radial deflection. As noted, the end 37 carries flange 52 which is suitably supported to casing 31 by a plurality of bolts 54 (only one being shown). Outer race 16 locked to the annular end 35 of members 30 by the action of nut 22 and flange 34 is therefore capable of deflecting radially.

This radial motion is transmitted to the oil damper 42 defined by the axially spaced rings 38 and 40 surrounding the entire outer race. Oil may be supplied thereto in any well known manner through drilled passage 46. It being understood that the dimension is exaggerated to illustrate the oil damper but in actual practice it is a small gap.

In operation, the thrust loads developed by the rotor are transmitted from shaft 18 to the thrust bearing 16 which, in turn, is transmitted by virtue of being locked to member 30, through member 30 to casing 31.

As is apparent from the foregoing, inasmuch as support member 30 has a lower spring rate than damper support 20 it can impart a radial motion to the oil and permit it to operate as a damper. Had there been no means to transmit the radial motion from shaft 18 as would be the case without member 30 the friction developed by the thrust loads would not permit the use of the damper. Preferably the spring rate of member 30 should be substantially equal to the spring rate of the oil film in the damper.

In the event of any severe radial excursions which may be occasioned by a lost blade on the rotor, severe flight manuevers or any large imbalance, end 35 of member 30 bottoms out on surface 36 and the stiffer member 20 will at this point absorb the radial loads.

By virtue of this invention the following features are evidenced.

1. Bearings that are oil damped on the race have a radial gap between the race outer diameter and the bearing support. It is this gap that allows the bearing to displace the oil film and provide damping. When the engine is not running and there is no oil pressure, the rotor settles until the bearing race bottoms on the support. The ability of the bearing to attain liftoff is a function of the oil film gap. Also, the spring rate of the oil film is a function of the gap (film thickness). The system has to be compromised to satisfy liftoff capability with some sacrifice for the damping capability. The oil damped support does not allow the rotor to settle because it does not rely on oil pressure to center itself. Therefore the gap is sized to get the optimum damping characteristics.

2. Existing thrust bearings that are oil damped require an oil film between thrust faces. The gap for the oil film allows for axial motion of the bearing, which is undesirable because it affects tower shaft gear engagement and blade location control. The oil damped support provides the axial control inherent in any stiff bearing design.

3. The oil damped support spring rate is predictable by calculation. Thurst on the bearing does not create a radial friction load to compound the damping characteristics. For a conventional oil damped thrust bearing, the fact that friction factors are difficult to predict means that bench tests are required before a bearing design can be finalized and even so, the results are never determined because the uncertainty factor associated with friction.

4. The success of a bearing support depends on how easily it can be designed to provide the spring rate required. The oil damped support system involves two spring rates in series, the spring rate of the support and that of the oil film. This fact allows for a finer tuning capability because two variables are available to finesse. A race damped thrust bearing does not allow this degree of design freedom.

It should be understood that the invention is not limited to the particular embodiments shown and described herein, but that various changes and modifications may be made without departing from the spirit or scope of this novel concept as defined by the following claims.

We claim:

1. For a thrust bearing rotatably supporting a shaft having a rotor developing thrust, support means having an annular portion concentric to and spaced from said thrust bearing, a radially flexible support means mounted between said thrust bearing and said support means normally supporting said thrust bearing, said radially flexible support means having a concentrically disposed annular portion defining between its outer diameter and the inner diameter of the annular portion of said support means a cavity for supporting an oil film for damping out vibration manifested by said shaft being transmitted thereto through said radially flexible support means and means securing said radially flexible support means and said support means so that thrust loads are transmitted to said securing means through said radially flexible support means.

2. For a thrust bearing as in claim 1 wherein said radially flexible support means is generally conical in shape, having the annular portion on one end and the opposite end being secured to a grounded member.

3. For a thrust bearing as in claim 2 wherein said radially flexible support means includes a plurality of circumferentially spaced web-like elements extending between the base and apex of said conically shaped element.

4. For a thrust bearing as in claim 2 wherein the stiffness of said support means is selected to absorb the radial loads manifested by a radial overload imposed on the thrust bearing so that the radially flexible support means is grounded on said support means and being rendered inoperative as a damping transmitting member.

5. For a thrust bearing as in claim 1 including axially spaced seal members between said annular portion of said support means and annular portion of said radially flexible support means.

6. For a thrust bearing as in claim 1 wherein the spring rate of said radially flexible support means is substantially equal to the spring rate of said film of oil constituting the oil damper.

* * * * *